United States Patent
Peng et al.

(10) Patent No.: US 12,063,154 B2
(45) Date of Patent: Aug. 13, 2024

(54) METHODS AND APPARATUSES FOR SENDING AND RECEIVING SEGMENT ROUTING TRAFFIC ENGINEERING POLICY, NETWORK ELEMENT, AND COMPUTER-READABLE STORAGE MEDIUM

(71) Applicant: ZTE CORPORATION, Shenzhen (CN)

(72) Inventors: Shaofu Peng, Shenzhen (CN); Detao Zhao, Shenzhen (CN); Hong Tang, Shenzhen (CN); Yongqing Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 44 days.

(21) Appl. No.: 17/638,783

(22) PCT Filed: May 9, 2020

(86) PCT No.: PCT/CN2020/089458
§ 371 (c)(1),
(2) Date: Feb. 25, 2022

(87) PCT Pub. No.: WO2021/036334
PCT Pub. Date: Mar. 4, 2021

(65) Prior Publication Data
US 2022/0278923 A1 Sep. 1, 2022

(30) Foreign Application Priority Data
Aug. 27, 2019 (CN) .......................... 201910798274.2

(51) Int. Cl.
*H04L 45/00* (2022.01)
*H04L 45/02* (2022.01)

(52) U.S. Cl.
CPC .............. *H04L 45/34* (2013.01); *H04L 45/02* (2013.01); *H04L 45/38* (2013.01)

(58) Field of Classification Search
CPC .......... H04L 45/34; H04L 45/02; H04L 45/38
(Continued)

(56) References Cited

U.S. PATENT DOCUMENTS

| 2017/0373966 A1 | 12/2017 | Liao et al. | |
| 2018/0109450 A1* | 4/2018 | Filsfils | H04L 45/04 |
| 2021/0119907 A1* | 4/2021 | Hu | H04L 45/22 |

FOREIGN PATENT DOCUMENTS

| CN | 105282028 A | 1/2016 |
| CN | 107666436 A | 2/2018 |

(Continued)

OTHER PUBLICATIONS

Chinese Office Action for Application No. 201910798274.2, 13 pages including translation.
(Continued)

*Primary Examiner* — Lan Dai T Truong
(74) *Attorney, Agent, or Firm* — Morgan, Lewis & Bockius LLP

(57) ABSTRACT

Disclosed are a method and apparatus for sending a segment routing traffic engineering (SR-TE) policy, a method and apparatus for receiving an SR-TE policy, a network element, and a computer-readable storage medium. The method for sending an SR-TE policy includes creating an SR-TE policy instance by a first network element; and sending an SR-TE policy corresponding to the SR-TE policy instance to a second network element by the first network element, where the SR-TE policy carries path identifier information and primary/standby state information of a segment list so as to support fast reroute (FRR) of a segment list level.

17 Claims, 3 Drawing Sheets

(58) Field of Classification Search
USPC .......................................................... 709/238
See application file for complete search history.

(56) References Cited

FOREIGN PATENT DOCUMENTS

| CN | 107666438 A | 2/2018 |
|---|---|---|
| CN | 108512702 A | 9/2018 |
| CN | 108809759 A | 11/2018 |
| CN | 109981458 A | 7/2019 |
| CN | 110120914 A | 8/2019 |
| CN | 110535772 A | 12/2019 |
| WO | WO-2015054904 A1 | 4/2015 |
| WO | WO-2017147076 A1 | 8/2017 |

OTHER PUBLICATIONS

English translation of Chinese Search Report for Application No. 201910798274.2, 1 page.

English translation of Chinese Supplementary Search Report for Application No. 201910798274.2, 1 page.

Filsfils, C., et al., "Segment Routing Policy Architecture, draft-ietf-spring-segment-routing-policy-03," IETF, Spring Working Group, Internet-Draft, May 12, 2019 (May 12, 2019), section 2.

Francois, Pierre, et al., "Topology Independent Fast Reroute using Segment Routing draft-francois-spring-segment-routing-ti-1fa-02", IETF Network Working Group, Internet-Drafts, Aug. 10, 2015, 10 pages.

International Search Report for Application No. PCT/CN2020/089458, dated Sep. 8, 2020, 6 pages including English translation.

Li, C., et al., "Segment Routing Policies for Path Segment and Bi-directional Path draft-li-idr-sr-policy-path-segment-distribution-00", IETF Interdomain Routing Working Group, Internet-Draft, Apr. 3, 2018, 10 pages.

Previdi, S., et al., "Distribution of Traffic Engineering (TE) Policies and State using BGP-LS, draft-ietf-idr-te-lsp-distribution-11", IETF Network Working Group, Internet-Draft, May 2, 2019 (May 2, 2019), sections 1, 2, and 6.

\* cited by examiner

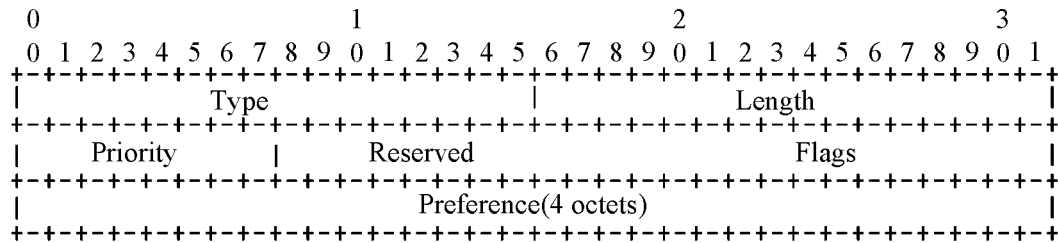

FIG. 5

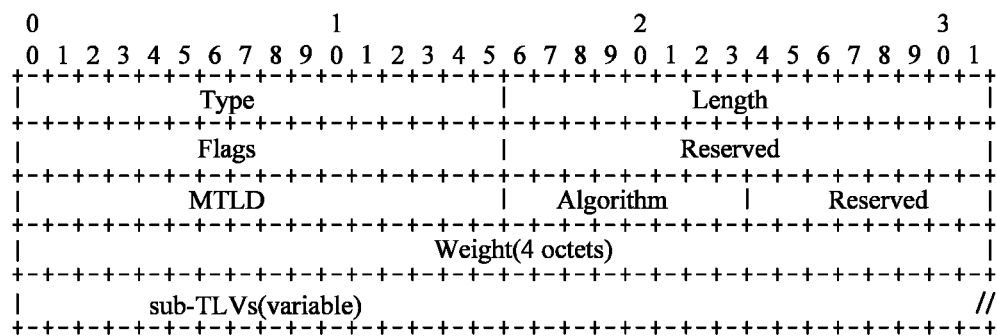

FIG. 6

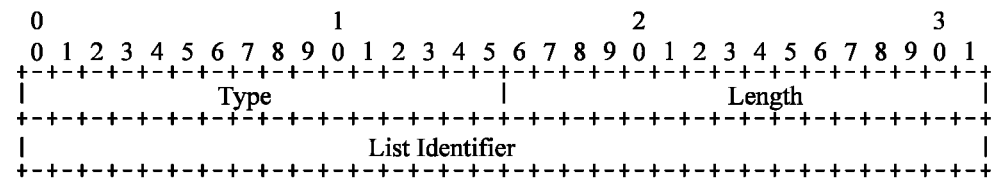

FIG. 7

201 A second network element receives an SR-TE policy sent by a first network element, where the SR-TE policy carries path identifier information and primary and standby state information of a segment list 202 The second network element creates a corresponding SR-TE policy instance according to the SR-TE policy, and determines FRR of a segment list level according to the path identifier information and the primary and standby state information of the segment list

FIG. 8

METHODS AND APPARATUSES FOR SENDING AND RECEIVING SEGMENT ROUTING TRAFFIC ENGINEERING POLICY, NETWORK ELEMENT, AND COMPUTER-READABLE STORAGE MEDIUM

CROSS-REFERENCE TO RELATED APPLICATIONS

This is a National stage application, filed under 37 U.S.C. 371, of International Patent Application NO. PCT/CN2020/089458, filed on May 9, 2020, which is based on and claims priority to Chinese patent application No. 201910798274.2 filed with the CNIPA on Aug. 27, 2019, disclosure of which is incorporated herein by reference in its entirety.

TECHNICAL FIELD

The present disclosure relates to a method and apparatus for sending a segment routing traffic engineering (SR-TE) policy, a method and apparatus for receiving an SR-TE policy, a network element, and a computer-readable storage medium.

BACKGROUND

The architecture of segment routing (SR) is described in Request For Comments 8402 (RFC 8402). With the segment routing technology, a node can designate a forwarding path for a specified packet, instead of general forwarding according to the shortest path. The packet is added with information related to a segment list formed by segment identifiers (SIDs), and state information of each path does not need to be maintained on an intermediate node. When the forwarding path of the packet needs to be modified, merely a new segment list needs to be put on the headend for a corresponding flow. The SR-TE is more advantageous than resource reservation protocol traffic engineering (RSVP-TE), and is especially suitable for software defined network (SDN) network scenarios. In the SR-TE solution, manufacturers create an SR-TE instance based on simple upgrading of the traditional RSVP-TE instance, that is, an SR-TE instance is presented as a tunnel to the outside and interfaced, occupying a large amount of tunnel resources and interface resources in network equipment, simple to apply but inflexible, and not conforming to SR's minimalist network idea.

The concept of an SR-TE policy and the manner of traffic import are described in draft-ietf-spring-segment-routing-policy-03. Compared with the SR-TE tunnel, an SR-TE policy instance does not need to be tunneled or interfaced, which can save a large amount of tunnel resources and interface resources and reduce the burden of computing and storage, so the SR-TE policy instance will be more advantageous in actual network deployment in the future. Multiple candidate paths can be included in the SR-TE policy, but only the candidate path with the highest priority can take effect, and multiple segment lists may be included in each candidate path and work in a load balancing mode.Draft-ietf-idr-segment-routing-te-policy-06 describes how a controller delivers an SR-TE policy to a network-side headend through a border gateway protocol (BGP) channel. Draft-ietf-idr-to-lsp-distribution-11 describes how the network-side headend (or through the reflector) reports the state of the SR-TE policy to the controller through a BGP link-state (BGP-LS) (North-Bound Distribution of Link-State and Traffic Engineering information Using BGP, see RFC 7752) channel. In these standard definitions, a control over the segment list in a candidate path is too crude to satisfy the rich service requirements.

SUMMARY

The present disclosure provides a method and apparatus for sending a segment routing traffic engineering (SR-TE) policy, a method and apparatus for receiving an SR-TE policy, a network element, and a computer-readable storage medium.

The present disclosure provides a method for sending an SR-TE policy. The method includes steps described below.

A first network element creates an SR-TE policy instance.

The first network element sends an SR-TE policy corresponding to the SR-TE policy instance to a second network element, where the SR-TE policy carries path identifier information and primary/standby state information of a segment list so as to support fast reroute (FRR) of a segment list level.

The present disclosure further provides a method for receiving an SR-TE policy. The method includes steps described below.

A second network element receives an SR-TE policy sent by a first network element, where the SR-TE policy carries path identifier information and primary/standby state information of a segment list.

The second network element creates a corresponding SR-TE policy instance according to the SR-TE policy, and determines FRR of a segment list level according to the path identifier information and the primary/standby state information of the segment list.

The present disclosure further provides an apparatus for sending an SR-TE policy. The apparatus includes a first policy module and a sending module.

The first policy module is configured to create an SR-TE policy instance.

The sending module is configured to send an SR-TE policy corresponding to the SR-TE policy instance to a second network element, where the SR-TE policy carries path identifier information and primary/standby state information of a segment list so as to support an FRR of a segment list level.

The present disclosure further provides an apparatus for receiving an SR-TE policy. The apparatus includes a receiving module and a second policy module.

The receiving module is configured to receive an SR-TE policy sent by a first network element, where the SR-TE policy carries path identifier information and primary/standby state information of a segment list.

The second policy module is configured to create a corresponding SR-TE policy instance according to the SR-TE policy, and determine FRR of a segment list level according to the path identifier information and the primary/standby state information of the segment list.

The disclosure further provides a network element. The network element includes a memory, a processor and a computer program stored in the memory and executable by the processor, where the processor is configured to execute the computer program to implement the method for sending an SR-TE policy described above.

The present disclosure further provides a network element. The network element includes a memory, a processor and computer programs stored in the memory and executable by the processor, where the processor is configured to execute the computer program to implement the method for receiving an SR-TE policy described above.

The present disclosure further provides a computer-readable storage medium storing computer-executable instructions for executing the method for sending an SR-TE policy described above.

The present disclosure further provides a computer-readable storage medium storing computer-executable instructions for executing the method for receiving an SR-TE policy described above.

BRIEF DESCRIPTION OF DRAWINGS

FIG. 5 is a format diagram of an SR candidate path state TLV in a BGP-LS channel implementation mode according to an embodiment of the present disclosure.

FIG. 6 is a format diagram of an SR segment list TLV in a BGP-LS channel implementation mode according to an embodiment of the present disclosure.

FIG. 7 is a format diagram of a list identifier Sub-TLV in a BGP-LS channel implementation mode according to an embodiment of the present disclosure.

FIG. 8 is a flowchart of a method for receiving an SR-TE policy according to an embodiment of the present disclosure.

DETAILED DESCRIPTION

The embodiments of the present disclosure will be described below in detail with reference to the drawings.

The steps illustrated in the flowcharts among the drawings may be performed by a computer system executing a set of computer-executable instructions, for example. Although logical sequences are illustrated in the flowcharts, the illustrated or described steps may be performed in sequences different from those described herein in some cases.

The SR-TE policy's control and forwarding model defined in the standard cannot satisfy the actual network service requirements. For example, in the standard, merely primary and standby protection of fast reroute (FRR) of a candidate path level is supported, and FRR of a segment list level in a candidate path is not supported. In fact, a more common deployment scheme in actual networking is to generate a candidate path from a single originator and needs to consider hot-standby protection within the candidate path. In addition, in the standard, the path of one segment list cannot be updated separately, and the management state of one segment list cannot be separately set according to the traffic tuning plan, and so on.

Figure 1:
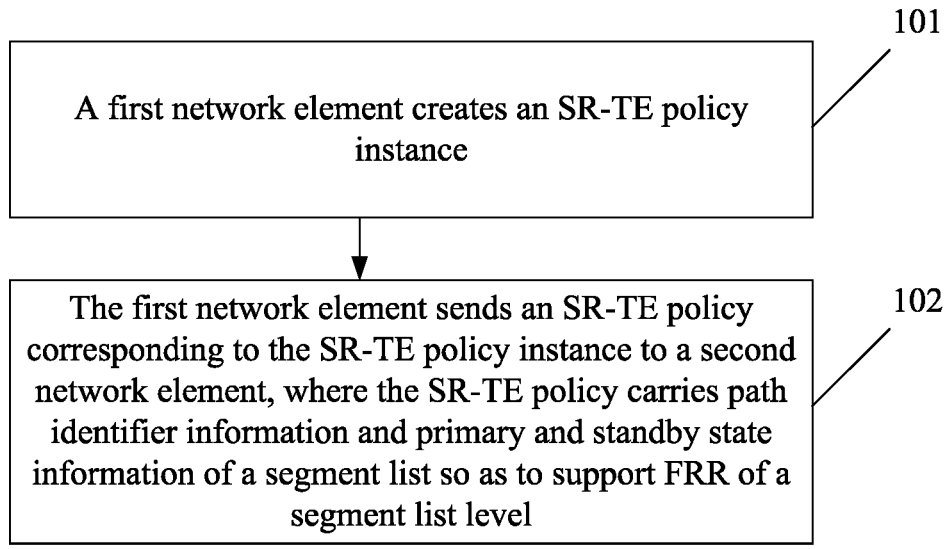
FIG. 1 is a flowchart of a method for sending an SR-TE policy according to an embodiment of the present disclosure.

As shown in FIG. 1, a method for sending an SR-TE policy provided in an embodiment of the present disclosure includes steps described below.

In step 101, a first network element creates an SR-TE policy instance.

The first network element may be a controller or a network-side headend.

When the controller actively creates an SR-TE policy instance locally, a corresponding candidate path may include multiple segment lists. By default, these segment lists form equal cost multi-paths (ECMPs) based on weight. The controller may set some of these segment lists as primary segment lists and others of these segment lists as standby segment lists according to the policy.

When a network-side headend actively creates an SR-TE policy instance locally (such as through configuration), each segment list in the corresponding candidate path may also be set to be in a primary or standby state according to the policy.

In step 102, the first network element sends an SR-TE policy corresponding to the SR-TE policy instance to a second network element, where the SR-TE policy carries path identifier information and primary/standby state information of a segment list so as to support FRR of a segment list level.

According to the embodiments of the present invention, the standard blank of the SR-TE policy is made up, the FRR of the segment list level in the candidate path can be supported, and the service requirement is satisfied.

In an embodiment, the first network element is a controller, and the second network element is a network-side headend. When the controller delivers an SR-TE policy to the network-side headend through BGP, each segment list in the BGP message contains its own clear identifier information and primary/standby state information, the network-side headend will create corresponding SR-TE policy entries according to the received BGP message, and in the SR-TE policy entries, segment lists in a primary state will form ECMPs and are protected by segment lists in a standby state. One simple example is that merely one primary segment list and one standby segment list are included in the candidate path and form FRR forwarding entries.

In an embodiment, the first network element is a network-side headend, the second network element is a controller, and when the network-side headend reports the SR-TE policy to the controller through a BGP-LS, each segment list in the BGP message contains its own clear identifier information and primary/standby state information.

In an embodiment, the SR-TE policy further carries management state information of a segment list, and the management state information includes a management UP state or a management DOWN state (which may also be referred to as a management shutdown state). The primary-standby switching can be achieved according to the management state information of the segment list and the path identifier information and primary/standby state information described above.

In an embodiment, the SR-TE policy further carries segment list state update information of a candidate path, where the segment list state update information is used for indicating entire replacement of all segment lists in the candidate path or update of a specified segment list.

In an embodiment, the first network element sends an update message for updating a state of a segment list in the candidate path of the SR-TE policy to the second network element, where the update message indicates, by carrying the segment list state update information, the entire replacement of all segment lists in the candidate path or the update of a specified segment list.

In the embodiments of the present disclosure, the path and state of one segment list can be separately updated, saving communication overhead.

For an SR-TE policy instance actively created locally by the controller, the controller can deliver a state update of a segment list in a corresponding candidate path of the SR-TE policy to the network-side headend through the BGP, and in this case, a flag may be set in the update message to indicate whether all the segment lists in the candidate path are replaced entirely or a corresponding segment list is updated according to a specified segment list identifier. The segment list state includes a management shutdown state in addition to path information.

For an SR-TE policy instance actively created locally by the network-side headend, the network-side headend can report a state update of a segment list in the corresponding candidate path of the SR-TE policy to the controller through the BGP-LS, and in this case, a flag may be set in the update message to indicate whether all the segment lists in the candidate path are replaced entirely or a corresponding segment list is updated according to an indicated segment list identifier. The segment list state includes a management shutdown state in addition to path information.

In the present disclosure, path identifier information, a primary/standby state and a management UP/DOWN state are added for a segment list in the SR-TE policy, and BGP and BGP-LS protocols are correspondingly extended, so that the path identifier information, the primary/standby state and the management UP/DOWN state of the segment list can be carried when the controller delivers the SR-TE policy to the network-side headend through the BGP or when the network-side headend reports the SR-TE policy to the controller through the BGP-LS.

Corresponding BGP and BGP-LS standard extensions are described below through embodiments.

1. BGP Standard Extension

In an embodiment, the first network element is a controller, and the second network element is a network-side headend. The first network element sends the SR-TE policy to the second network element through a BGP message. A list identifier Sub-TLV is carried in a segment list Sub-TLV in the BGP message and used for indicating the path identifier information. A flags field is carried in the segment list Sub-TLV, an S-Flag in the flags field is used for indicating the management state information, and a B-Flag in the flags field is used for indicating the primary/standby state information. An M-Flag is carried in a flags field of a preference Sub-TLV in the BGP message and used for indicating the segment list state update information.

Figure 2:
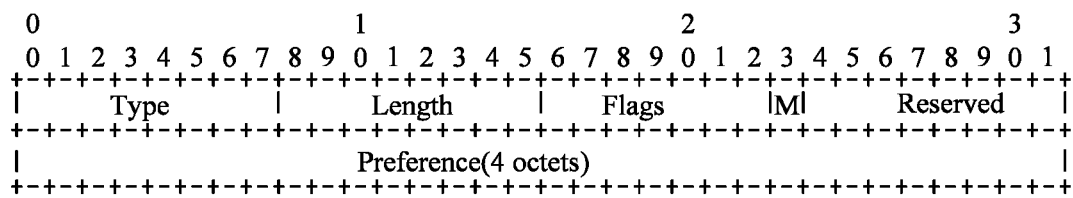
FIG. 2 is a format diagram of a preference sub-type-length-value (preference Sub-TLV) in a BGP channel implementation mode according to an embodiment of the present disclosure.

1) The preference Sub-TLV is defined in draft-ietf-idr-segment-routing-te-policy-06, and as shown in FIG. 2, no flag is defined in the flags field temporarily, and a modified flag (M-flag) is newly added in the present disclosure.

For the M-Flag, a value of 0 indicates that all the old segment lists are entirely replaced with the latest segment lists when the segment list state is updated, and a value of 1 indicates that merely the segment list corresponding to the specified segment list identifier is updated when the segment list state is updated.

Figure 3:
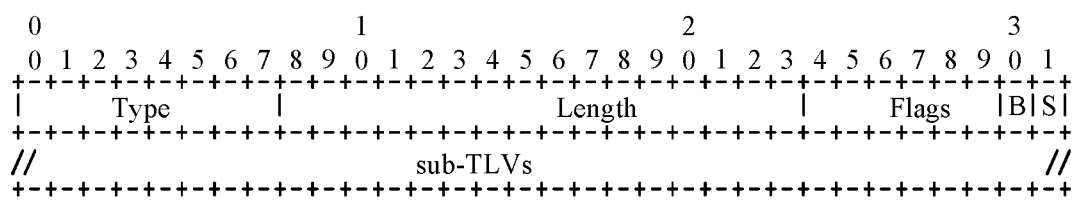
FIG. 3 is a format diagram of a segment list Sub-TLV in a BGP channel implementation mode according to an embodiment of the present disclosure.

2) The segment list Sub-TLV is defined in draft-ietf-idr-segment-routing-te-policy-06, and as shown in FIG. 3, the RESERVED field is changed to a flags field, and a shutdown flag (S-Flag) and a backup flag (B-Flag) are added in the present disclosure.

For the S-Flag, a value of 0 indicates that the segment list is not set to the management shutdown state, and a value of 1 indicates that the segment list is set to the management shutdown state.

For the B-Flag, a value of 0 indicates that the segment list is a primary member in the candidate path to which the primary member belongs, and a value of 1 indicates that the segment list is a standby member in the candidate path to which the segment list belongs.

Figure 4:
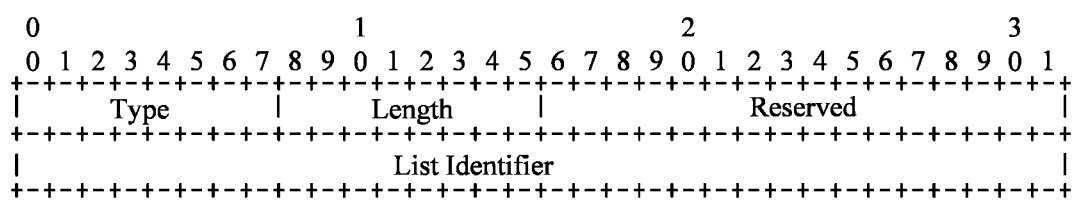
FIG. 4 is a format diagram of a list identifier Sub-TLV in a BGP channel implementation mode according to an embodiment of the present disclosure.

3) A list identifier Sub-TLV is newly added in the segment list Sub-TLV defined by draft-ietf-idr-segment-routing-te-policy-06, and as shown in FIG. 4, as the identifier information of the corresponding segment list, the list identifier Sub-TLV is convenient for operation of the corresponding segment list according to the specified segment list identifier.

2. BGP-LS Standard Extension

In an embodiment, the first network element is a network-side headend and the second network element is a controller. The first network element sends the SR-TE policy to the second network element through a BGP-LS message. A list identifier Sub-TLV is carried in an SR segment list Sub-TLV in the BGP-LS message, and the SR segment list TLV is used for indicating the path identifier information. An S-Flag and a B-Flag are carried in a flags field of the SR segment list TLV, where the S-Flag is used for indicating the management state information, and the B-Flag is used for indicating the primary/standby state information. An M-Flag is carried in a flags field of an SR candidate path state TLV in the BGP-LS message and used for indicating the segment list state update information.

1) The SR candidate path state TLV is defined in draft-ietf-idr-to-lsp-distribution-11, and as shown in FIG. 5, flags of S, A, B, E, V, O, D, C, I and T have been defined in the flags field, and an M-Flag is newly added in the present disclosure.

For the M-Flag, a value of 0 indicates that all the old segment lists are entirely replaced with the latest segment lists when the segment list state is updated; a value of 1 indicates that merely the segment list corresponding to the specified segment list identifier is updated when the segment list state is updated.

2) The SR segment list TLV is defined in draft-ietf-idr-to-lsp-distribution-11, and as shown in FIG. 6, these flags of D, E, C, V, R, F, A, T and M have been defined in the flags field, and an S-Flag and a B-Flag are newly added in the embodiment of the present disclosure.

For the S-Flag, a value of 0 indicates that the segment list is not set to the management shutdown state, and a value of 1 indicates that the segment list is set to the management shutdown state.

For the B-Flag, a value of 0 indicates that the segment list is a primary member in the candidate path to which the primary member belongs, and a value of 1 indicates that the segment list is a standby member in the candidate path to which the segment list belongs.

3) A list identifier Sub-TLV is newly added in the SR segment list TLV defined by draft-ietf-idr-te-lsp-distribution-11, and as shown in FIG. 7, as the identifier information of the corresponding segment list, the list identifier Sub-TLV is convenient for operation of the corresponding segment list according to the specified segment list identifier.

As shown in FIG. 8, a method for receiving an SR-TE policy is further provided in an embodiment of the present disclosure and includes steps described below.

In step 201, a second network element receives an SR-TE policy sent by a first network element, where the SR-TE policy carries path identifier information and primary/standby state information of a segment list.

The first network element is a controller, and the second network element is a network-side headend. Alternatively, the first network element is a network-side headend, and the second network element is a controller.

In an embodiment, the SR-TE policy further carries management state information of a segment list, and the management state information includes a management UP state or a management DOWN state.

In an embodiment, the SR-TE policy further carries segment list state update information of a candidate path, where the segment list state update information is used for indicating entire replacement of all segment lists in the candidate path or update of a specified segment list.

In step 202, the second network element creates a corresponding SR-TE policy instance according to the SR-TE policy, and determines FRR of a segment list level according to the path identifier information and the primary/standby state information of the segment list.

In an embodiment, the first network element is a controller, and the second network element is a network-side headend. The network-side headend receives an SR-TE policy delivered by the controller through a BGP, and each segment list in the BGP message contains its own clear identifier information and primary/standby state information. The network-side headend will create corresponding SR-TE policy entries according to the received BGP message, and in the SR-TE policy entries, segment lists in a primary state will form ECMPs and are protected by segment lists in a standby state. One simple example is that merely one primary segment list and one standby segment list are included in the candidate path and form FRR forwarding entries.

In an embodiment, the first network element is a network-side headend, the second network element is a controller, the controller receives the SR-TE policy reported to the controller by the network-side headend through the BGP-LS, and clear identifier information and primary/standby state information of each segment list are included in the BGP-LS message. After receiving the BGP-LS message, the controller creates a corresponding SR-TE policy instance, and under the SR-TE policy instance, primary and standby segment lists are included in the candidate path to form an FRR. Based on the information, the controller can locally generate a traffic import policy to decide which traffic can be imported into the SR-TE policy, and deliver the traffic import policy to the network-side headend.

According to the embodiment of the present invention, the standard blank of the SR-TE policy is made up, the FRR of the segment list level in the candidate path can be supported, and the service requirement is satisfied.

In an embodiment, the first network element sends an update message for updating a state of a segment list in the candidate path of the SR-TE policy to the second network element, where the update message indicates, by carrying the segment list state update information, the entire replacement of all segment lists in the candidate path or the update of a specified segment list.

In the embodiment of the present disclosure, the path and state of one segment list can be separately updated, saving communication overhead.

Several application examples are described below.

Application Example One

Figure 9:
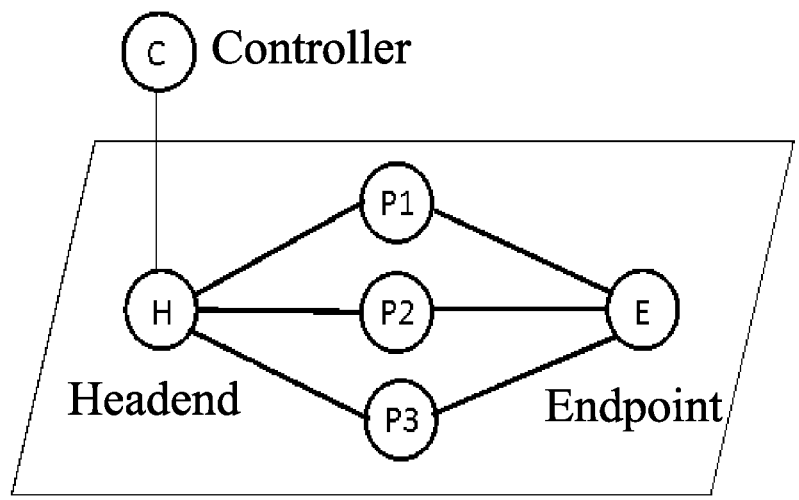
FIG. 9 is a network topology diagram according to an application instance of the present disclosure.

The present disclosure example describes how a controller (node C) delivers an SR-TE policy to a network side through a BGP channel. As shown in FIG. 9, the controller locally and actively creates an SR-TE policy, and assuming that a headend of the SR-TE policy is a node H, an endpoint is a node E and the color is 100, the controller performs calculation to obtain a corresponding candidate path (i.e., an originator is the controller C) for the SR-TE policy, where two segment lists are included in the candidate path and form a hot-standby protection relationship. A first segment list of the two segment lists, which serves as a primary member, is identified as 1 and has path information of {P1, E}. A second segment list of the two segment lists, which serves as a standby member, is identified as 2 and has path information of {P2, E}.

The controller C delivers the above SR-TE policy to the network-side headend H through the BGP channel, where the M-Flag in the preference Sub-TLV is set to 0, indicating that all segment lists are overwritten and updated. The segment list Sub-TLV corresponding to the first segment list includes a list identifier of 1, a B-Flag set to 0 to indicate the first segment list functioning as a primary member, and path information of {P1, E}. The segment list Sub-TLV corresponding to the second segment list includes a list identifier of 2, a B-Flag set to 1 to indicate the second segment list functioning as a standby member, and path information of {P2, E}.

After receiving the above BGP message, the node H will create a corresponding SR-TE policy instance, and under the SR-TE policy instance, a candidate path whose originator is the controller C is maintained, the above two segment lists are included in the candidate path to form FRR, and the FRR is delivered to a forwarding plane (when no other candidate path with a higher priority exists under the SR-TE policy instance).

Application Example Two

This application example is based on application example one, and describes how the controller (node C) sends an update of one segment list in an SR-TE policy to the network side through a BGP channel. Still as shown in FIG. 9, after the controller actively and locally creates an SR-TE policy instance <Headend=H, Color=100, Endpoint=E>, due to the change of network topology, the controller finds through calculation that the path of the primary segment list has changed from the original {P1, E} to {P3, E}.

The controller C delivers the above update of the SR-TE policy to the network-side headend H through the BGP, where the M-Flag in the preference Sub-TLV is set to 1, indicating that merely a specified segment list is updated. The update message includes merely the first segment list, and the corresponding segment list Sub-TLV includes a list identifier of 1, a B-Flag set to 0 as an indication of a primary member, and path information of {P3, E}.

After receiving the above BGP message, the node H will find the previously created SR-TE policy instance, and then find the candidate path whose originator is the controller C. According to the list identifier of 1, the path information of the primary segment list is updated to {P3, E}, while the path information of the standby segment list remains unchanged. The FRR formed by the primary and standby segment lists continues to take effect.

Similarly, the controller C can also set the management shutdown state separately for the primary segment list and delivers the update message of the management shutdown state to the network-side headend H. At this time, the M-Flag in the preference Sub-TLV is set to 1, indicating that merely the specified segment list is updated, merely the first segment list is included in the candidate path, the corresponding segment list Sub-TLV includes a list identifier of 1, a B-Flag set to 0 as an indication of a primary member, and the S-Flag set to 1 as indication of the management shutdown state. After reception, the node H will force the above FRR to be subjected to primary-standby switching so that the traffic is switched to the standby segment list.

Application Example Three

The application example describes how a network-side headend sends an SR-TE policy to a controller through a BGP-LS channel. Still as shown in FIG. 9, the network-side headend H locally and actively creates one SR-TE policy, and assuming that a headend of the SR-TE policy is a node H, an endpoint is a node E, and the color is 200, the node H performs calculation to obtain a corresponding candidate path (i.e., an originator is H) for the SR-TE policy, where two segment lists are included in the candidate path and form a hot-standby protection relationship. A first segment list of the two segment lists, which serves as a primary member, is identified as 1 and has path information of {P1, E}, A second segment list of the two segment lists, which serves as the standby member, is identified as 2 and has path information of {P2, E}.

The network-side headend H sends the above SR-TE policy to the controller C through the BGP-LS channel, where the M-Flag in the SR candidate path state TLV is set to 0, indicating that all segment lists are overwritten and updated. The segment list Sub-TLV corresponding to the first segment list includes a list identifier of 1, a B-Flag set to 0 as an indication of a primary member, and path information of {P1, E}. The segment list Sub-TLV corresponding to the second segment list includes a list identifier of 2, a B-flag set to 1 as an indication of a standby member, and path information of {P2, E}.

After receiving the above BGP-LS message, the controller C will create a corresponding SR-TE policy instance. Under the SR-TE policy instance, the candidate path whose originator is the node H is maintained, and the above two segment lists are included in the candidate path to form FRR. Based on the information, the controller can locally generate a traffic import policy to decide which traffic can be imported into the SR-TE policy, and deliver the traffic import policy to the node H.

Application Example Four

This application example is based on application example three, and continues to describe the SR-TE policy actively and locally created by the network-side headend H. Since multiple segment lists are included in the candidate path of the SR-TE policy <Headend=H, Color=200, Endpoint=E>, and each segment list has a clear and unique identifier, seamless bidirectional forwarding detection (SBFD) of each segment list can be started separately on the node H. For example, during detection of the first segment list described above, the detection keyword input to the SBFD detection module may be <Headend=H, Color=200, Endpoint=E, Originator=H, List-Identifier=1>, which is much clearer and more stable than directly taking path information {P1, E} of the segment list as the detection keyword. Assuming that the SBFD detection result for the primary segment list is DOWN and the SBFD detection result for the standby segment list is UP, the node H can instruct the above FRR to be switched so that the traffic is switched to the standby segment list.

In addition, the node H may also send a state update of the primary segment list in the SR-TE policy to the controller C through the BGP-LS according to the detection result. The M-Flag in the SR candidate path state TLV is set to 1 to indicate that merely the specified segment list is updated, and merely the first segment list is included in the candidate path. The corresponding segment list Sub-TLV includes a list identifier of 1, a B-Flag set to 0 as an indication of a primary member, and an S-Flag set to 1 as an indication of the management shutdown state.

After receiving the above BGP-LS message, the controller C will find the previously collected and created SR-TE policy instance. Under the SR-TE policy instance, a candidate path whose originator is the node H exists, and the state of the primary segment list in the candidate path is updated to DOWN. Based on the information, the controller can locally regenerate a traffic import policy to decide which traffic can be imported into the SR-TE policy, and deliver the traffic import policy to the node H.

Figure 10:
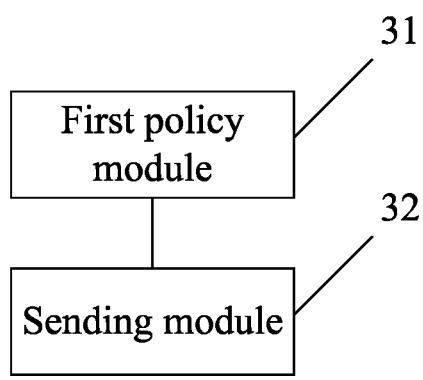
FIG. 10 is a schematic diagram of an apparatus for sending an SR-TE policy according to an embodiment of the present disclosure.

As shown in FIG. 10, an apparatus for sending an SR-TE policy is further provided in an embodiment of the present disclosure and includes a first policy module 31 and a sending module 32.

The first policy module 31 is configured to create an SR-TE policy instance.

The sending module 32 is configured to send an SR-TE policy corresponding to the SR-TE policy instance to a second network element, where the SR-TE policy carries path identifier information and primary/standby state information of a segment list so as to support FRR of a segment list level.

In an embodiment, the SR-TE policy further carries management state information of a segment list, and the management state information includes a management UP state or a management DOWN state; and the SR-TE policy further carries segment list state update information of a candidate path, where the segment list state update information is used for indicating entire replacement of all segment lists in the candidate path or update of a specified segment list.

In an embodiment, the sending module 32 is configured to send the SR-TE policy to the second network element through a BGP message. A list identifier Sub-TLV is carried in a segment list Sub-TLV in the BGP message and used for indicating the path identifier information. A flags field is carried in the segment list Sub-TLV, an S-Flag in the flags field is used for indicating the management state information, and a B-Flag in the flags field is used for indicating the primary/standby state information. An M-Flag is carried in a flags field of a preference Sub-TLV in the BGP message and used for indicating the segment list state update information.

In an embodiment, the sending module 32 is configured to send the SR-TE policy to the second network element through a BGP-LS message. A list identifier Sub-TLV is carried in a segment list Sub-TLV in the BGP-LS message, and the SR segment list TLV is used for indicating the path identifier information. An S-Flag and a B-Flag are carried in a flags field of the SR segment list TLV, where the S-Flag is used for indicating the management state information, and the B-Flag is used for indicating the primary/standby state information. An M-Flag is carried in a flags field of an SR candidate path state TLV in the BGP-LS message and used for indicating the segment list state update information.

In an embodiment, the sending module 32 is further configured to send an update message for updating a state of a segment list in the candidate path of the SR-TE policy to the second network element, where the update message indicates, by carrying the segment list state update information, the entire replacement of all segment lists in the candidate path or the update of a specified segment list.

Figure 11:
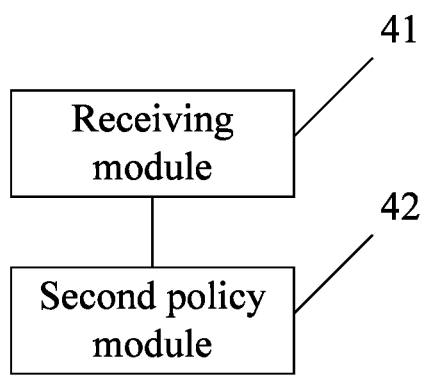
FIG. 11 is a schematic diagram of an apparatus for receiving an SR-TE policy according to an embodiment of the present disclosure.

As shown in FIG. 11, an apparatus for receiving an SR-TE policy is further provided in an embodiment of the present disclosure and includes a receiving module 41 and a second policy module 42.

The receiving module 41 is configured to receive an SR-TE policy sent by a first network element, where the SR-TE policy carries path identifier information and primary/standby state information of a segment list.

The second policy module 42 is configured to create a corresponding SR-TE policy instance according to the SR-TE policy, and determine FRR of a segment list level according to the path identifier information and the primary/standby state information of the segment list.

In an embodiment, the SR-TE policy further carries management state information of a segment list, and the management state information includes a management UP state or a management DOWN state; and the SR-TE policy further carries segment list state update information of a candidate path, where the segment list state update information is used for indicating entire replacement of all segment lists in the candidate path or update of a specified segment list.

In an embodiment, the receiving module 41 is further configured to receive an update message for updating a state of a segment list in the candidate path of the SR-TE policy sent by the first network element, where the update message carries the segment list state update information.

The second policy module 42 is further configured to entirely replace all segment lists in the candidate path or update the specified segment list according to the segment list state update information.

A network element is further provided in an embodiment of the present disclosure. The network element includes a memory, a processor and a computer program stored in the memory and executable by the processor, where the processor is configured to execute the computer program to implement the method for sending an SR-TE policy.

A network element is further provided in an embodiment of the present disclosure. The network element includes a memory, a processor and a computer program stored in the memory and executable by the processor, where the processor is configured to execute the computer program to implement the method for receiving an SR-TE policy.

A computer-readable storage medium is further provided in an embodiment of the present disclosure. The computer-readable storage medium is configured to store computer-executable instructions for executing the method for sending an SR-TE policy.

A computer-readable storage medium is further provided in an embodiment of the present disclosure. The computer-readable storage medium is configured to store computer-executable instructions for executing the method for receiving an SR-TE policy.

In this embodiment, the storage medium may include, but is not limited to, a universal serial bus flash disk, a read-only memory (ROM), a random access memory (RAM), a mobile hard disk, a magnetic disk, an optical disk or another medium capable of storing program codes.

All or part of the steps in the method, and functional modules/units in the system and apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all components may be implemented as software executed by a processor such as a digital signal processor or a microcontroller, hardware, or an integrated circuit such as an application specific integrated circuit. Such software may be distributed on a computer-readable medium, which may include a computer storage medium (or a non-transitory medium) and a communication medium (or a transitory medium). A term, computer storage medium, includes volatile and nonvolatile, removable and non-removable media implemented in any method or technology for storage of information (such as computer-readable instructions, data structures, program modules or other data). The computer storage medium includes, but is not limited to, a RAM, a ROM, an electrically erasable programmable read-only memory (EEPROM), a flash memory, or other memory technologies, a compact disc read-only memory (CD-ROM), a digital video disc (DVD) or other optical disc memories, magnetic cassettes, magnetic tapes, magnetic disk memories or other magnetic storage devices, or any other medium used for storing the desired information and accessible by a computer. The communication medium generally includes computer-readable instructions, data structures, program modules or other data in a modulated data signal such as carriers or other transport mechanisms, and may include any information delivery medium.

What is claimed is:

1. A method for sending a segment routing traffic engineering (SR-TE) policy, comprising:
    creating, by a first network element, an SR-TE policy instance; and
    sending, by the first network element, an SR-TE policy corresponding to the SR-TE policy instance to a second network element, wherein the SR-TE policy carries path identifier information and primary state information of a segment list, or carries the path identifier information and standby state information of the segment list so as to support fast reroute (FRR) of a segment list level;
    wherein the SR-TE policy further carries management state information of the segment list and segment list state update information of a candidate path, wherein the management state information comprises a management UP state or a management DOWN state, and the segment list state update information is used for indicating entire replacement of all segment lists in the candidate path or update of a specified segment list.

2. The method of claim 1, wherein the first network element is a controller, and the second network element is a network-side headend; and
    sending, by the first network element, the SR-TE policy corresponding to the SR-TE policy instance to the second network element comprises:
    sending, by the first network element, the SR-TE policy to the second network element through a border gateway protocol (BGP) message, wherein the BGP message comprises a segment list sub-type-length-value (Sub-TLV), the segment list Sub-TLV comprises a list identifier Sub-TLV and a flags field, the list identifier Sub-TLV is used for indicating the path identifier information, and a B-Flag in the flags field is used for indicating the primary state information or the standby state information.

3. The method of claim 2, wherein
an S-Flag in the flags field of the segment list Sub-TLV is used for indicating the management state information.

4. The method of claim 3, further comprising:
sending, by the first network element, an update message for updating a state of a segment list in the candidate path of the SR-TE policy to the second network element, wherein the update message is used form indicating, by carrying the segment list state update information, the entire replacement of the all segment lists in the candidate path or the update of the specified segment list.

5. The method of claim 2, wherein
the BGP message further comprises a preference Sub-TLV, and an M-Flag in a flags field of the preference Sub-TL V is used for indicating the segment list state update information.

6. The method of claim 5, further comprising:
sending, by the first network element, an update message for updating a state of a segment list in the candidate path of the SR-TE policy to the second network element, wherein the update message is used form indicating, by carrying the segment list state update information, the entire replacement of the all segment lists in the candidate path or the update of the specified segment list.

7. The method of claim 2, further comprising:
sending, by the first network element, an update message for updating a state of a segment list in the candidate path of the SR-TE policy to the second network element, wherein the update message is used form indicating, by carrying the segment list state update information, the entire replacement of the all segment lists in the candidate path or the update of the specified segment list.

8. The method of claim 1, wherein the first network element is a network-side headend, and the second network element is a controller; and
sending, by the first network element, the SR-TE policy corresponding to the SR-TE policy instance to the second network element comprises:
sending, by the first network element, the SR-TE policy to the second network element through a BGP link-state (BGP-LS) message,
wherein the BGP-LS message comprises a segment routing (SR) segment list TLV, the SR segment list TLV comprises a list identifier Sub-TLV and a flags field, the list identifier Sub-TLV is used for indicating the path identifier information, and a B-Flag in the flags field is used for indicating the primary state information or the standby state information.

9. The method of claim 8, wherein
an S-Flag in the flags field of the SR segment list TLV is used for indicating the management state information.

10. The method of claim 8, wherein
the BGP-LS message further comprises an SR candidate path state TLV, and an M-Flag in a flags field of the SR candidate path state TLV is used for indicating the segment list state update information.

11. The method of claim 8, further comprising:
sending, by the first network element, an update message for updating a state of a segment list in the candidate path of the SR-TE policy to the second network element, wherein the update message is used form indicating, by carrying the segment list state update information, the entire replacement of the all segment lists in the candidate path or the update of the specified segment list.

12. The method of claim 1, further comprising:
sending, by the first network element, an update message for updating a state of a segment list in the candidate path of the SR-TE policy to the second network element, wherein the update message is used form indicating, by carrying the segment list state update information, the entire replacement of the all segment lists in the candidate path or the update of the specified segment list.

13. A network element, comprising a memory, a processor, and a computer program stored in the memory and executable by the processor, wherein the processor is configured to execute the computer program to implement the method of claim 1.

14. A non-transitory computer-readable storage medium storing computer-executable instructions for executing the method of claim 1.

15. The method of claim 1, further comprising:
receiving, by a second network element, an SR-TE policy sent by a first network element, wherein the SR-TE policy carries path identifier information and primary state information of a segment list, or carries the path identifier information and standby state information of a segment list; and
creating, by the second network element, a corresponding SR-TE policy instance according to the SR-TE policy, and determining fast reroute (FRR) of a segment list level according to the path identifier information and the primary state information of the segment list, or according to the path identifier information and the standby state information of the segment list.

16. The method of claim 15, further comprising:
receiving, by the second network element, an update message for updating a state of a segment list in the candidate path of the SR-TE policy sent by the first network element, wherein the update message carries the segment list state update information; and
performing, by the second network element according to the segment list state update information, the entire replacement of the all segment lists in the candidate path or the update of the specified segment list.

17. An apparatus for sending a segment routing traffic engineering (SR-TE) policy, comprising a memory, a processor, and a computer program stored in the memory and executable by the processor;
wherein the processor is configured to
create an SR-TE policy instance; and
send an SR-TE policy corresponding to the SR-TE policy instance to a second network element, wherein the SR-TE policy carries path identifier information and primary state information of a segment list, or carries the path identifier information and standby state information of a segment list so as to support fast reroute (FRR) of a segment list level;
wherein the SR-TE policy further carries management state information of the segment list and segment list state update information of a candidate path, wherein the management state information comprises a management UP state or a management DOWN state, and the segment list state update information is used for indicating entire replacement of all segment lists in the candidate path or update of a specified segment list.

\* \* \* \* \*